(12) United States Patent
Oddsen, Jr. et al.

(10) Patent No.: US 8,919,716 B2
(45) Date of Patent: Dec. 30, 2014

(54) TILTER FOR POSITIONING AN ELECTRONIC DEVICE

(71) Applicant: Innovative Office Products, Inc., Easton, PA (US)

(72) Inventors: Odd N. Oddsen, Jr., Easton, PA (US); Bradley A. Derry, Easton, PA (US)

(73) Assignee: Innovative Office Products, LLC, Easton, PA (US)

( * ) Notice: Subject to any disclaimer, the term of this patent is extended or adjusted under 35 U.S.C. 154(b) by 0 days.

(21) Appl. No.: 14/013,357

(22) Filed: Aug. 29, 2013

(65) Prior Publication Data

US 2014/0001331 A1 Jan. 2, 2014

Related U.S. Application Data

(63) Continuation of application No. 12/901,199, filed on Oct. 8, 2010, now Pat. No. 8,523,131.

(60) Provisional application No. 61/249,789, filed on Oct. 8, 2009.

(51) Int. Cl.
*F16M 11/10* (2006.01)
*F16M 11/04* (2006.01)
*F16M 11/12* (2006.01)
*F16M 11/20* (2006.01)
*F16M 11/18* (2006.01)

(52) U.S. Cl.
CPC ............ *F16M 11/10* (2013.01); *F16M 11/04* (2013.01); *F16M 11/105* (2013.01); *F16M 11/12* (2013.01); *F16M 11/2064* (2013.01); *F16M 11/18* (2013.01); *F16M 2200/041* (2013.01)
USPC ................... 248/292.13; 248/286.1; 16/338

(58) Field of Classification Search
CPC . F16M 11/10; F16M 11/105; F16M 11/2064; F16M 2200/041
USPC ............ 248/280.11, 292.13, 371, 372.1, 565, 248/568, 596, 597, 919, 923, 920; 16/338; 361/679.07, 679.21, 679.27, 679.06
See application file for complete search history.

(56) References Cited

U.S. PATENT DOCUMENTS

| | | | | |
|---|---|---|---|---|
| 3,463,520 A | * | 8/1969 | Turro | 403/362 |
| 3,822,848 A | * | 7/1974 | Hopkins | 248/279.1 |
| 3,862,734 A | * | 1/1975 | Buchin et al. | 248/125.2 |
| 4,447,031 A | * | 5/1984 | Souder et al. | 248/281.11 |
| 4,516,751 A | * | 5/1985 | Westbrook | 248/279.1 |
| 4,703,909 A | * | 11/1987 | Dayton et al. | 248/280.11 |
| 4,768,744 A | * | 9/1988 | Leeds et al. | 248/280.11 |
| 4,774,961 A | * | 10/1988 | Carr | 600/549 |
| 4,836,478 A | * | 6/1989 | Sweere | 248/279.1 |
| 4,944,481 A | * | 7/1990 | Yurchenco et al. | 248/372.1 |
| 5,007,608 A | * | 4/1991 | Carroll, Jr. | 248/297.21 |

(Continued)

*Primary Examiner* — Terrell McKinnon
*Assistant Examiner* — Eret McNichols
(74) *Attorney, Agent, or Firm* — Design IP

(57) ABSTRACT

A tilter assembly is disclosed which comprises a pair of springs, each of which is coupled to the tilter body and the center tilt mount, that provide a counterbalance force to support the weight of a user device which is attached to the tilter. A bushing, which is capable of providing force to a friction cylinder which permits rotation of the tilter about an axis, is adjustable vis-à-vis the friction cylinder via a set screw to provide additional counterbalance force to the tilter to support the weight of the user device.

14 Claims, 10 Drawing Sheets

(56) References Cited

U.S. PATENT DOCUMENTS

| | | | | |
|---|---|---|---|---|
| 5,108,061 | A * | 4/1992 | Vlasak | 248/162.1 |
| 5,183,162 | A * | 2/1993 | Ritzenthaler | 211/1.57 |
| 5,231,734 | A * | 8/1993 | Rude | 16/342 |
| 5,240,215 | A * | 8/1993 | Moore | 248/279.1 |
| 5,240,218 | A * | 8/1993 | Dye | 248/330.1 |
| 5,435,515 | A * | 7/1995 | DiGiulio et al. | 248/576 |
| 5,503,491 | A * | 4/1996 | Lu | 403/86 |
| 5,566,048 | A * | 10/1996 | Esterberg et al. | 361/679.27 |
| 5,570,498 | A * | 11/1996 | Hipkiss et al. | 16/258 |
| 5,799,917 | A * | 9/1998 | Li | 248/284.1 |
| 5,894,633 | A * | 4/1999 | Kaneko | 16/306 |
| 6,019,332 | A * | 2/2000 | Sweere et al. | 248/284.1 |
| 6,092,264 | A * | 7/2000 | Banks | 16/321 |
| 6,113,046 | A * | 9/2000 | Wang | 248/278.1 |
| 6,189,849 | B1 * | 2/2001 | Sweere et al. | 248/286.1 |
| 6,286,794 | B1 * | 9/2001 | Harbin | 248/123.2 |
| 6,347,433 | B1 * | 2/2002 | Novin et al. | 16/367 |
| 6,354,549 | B2 * | 3/2002 | Sweere et al. | 248/292.14 |
| 6,382,577 | B1 * | 5/2002 | McCoy et al. | 248/284.1 |
| 6,488,599 | B2 * | 12/2002 | Nye | 473/483 |
| 6,505,988 | B1 * | 1/2003 | Oddsen, Jr. | 403/110 |
| 6,530,122 | B1 * | 3/2003 | Kondou et al. | 16/335 |
| 6,532,628 | B2 * | 3/2003 | Kim | 16/342 |
| 6,584,646 | B2 * | 7/2003 | Fujita | 16/342 |
| 6,609,272 | B1 * | 8/2003 | Lee | 16/307 |
| 6,665,906 | B2 * | 12/2003 | Li | 16/330 |
| 6,666,422 | B1 * | 12/2003 | Lu et al. | 248/291.1 |
| 6,672,553 | B1 * | 1/2004 | Lin | 248/276.1 |
| 6,698,063 | B2 * | 3/2004 | Kim et al. | 16/337 |
| 6,779,234 | B1 * | 8/2004 | Lu et al. | 16/340 |
| 7,048,242 | B2 * | 5/2006 | Oddsen, Jr. | 248/280.11 |
| 7,063,296 | B2 * | 6/2006 | Williams | 248/285.1 |
| 7,147,191 | B2 * | 12/2006 | Ichikawa et al. | 248/292.12 |
| 7,177,144 | B2 * | 2/2007 | Ha et al. | 361/679.06 |
| 7,458,549 | B2 * | 12/2008 | Oddsen, Jr. | 248/280.11 |
| 7,472,459 | B2 * | 1/2009 | Lee et al. | 16/342 |
| 7,604,210 | B2 * | 10/2009 | Oddsen et al. | 248/280.11 |
| 7,643,276 | B2 * | 1/2010 | Shin | 361/679.06 |
| 7,698,784 | B2 * | 4/2010 | Hsu et al. | 16/337 |
| 7,806,378 | B2 * | 10/2010 | Oddsen, Jr. | 248/280.11 |
| 8,011,632 | B2 * | 9/2011 | Wang et al. | 248/284.1 |
| 8,074,956 | B2 * | 12/2011 | Wang et al. | 248/688 |
| 2003/0172496 | A1 * | 9/2003 | Cha | 16/342 |
| 2003/0172497 | A1 * | 9/2003 | Cha | 16/342 |
| 2004/0245419 | A1 * | 12/2004 | Sweere et al. | 248/276.1 |
| 2004/0251389 | A1 * | 12/2004 | Oddsen, Jr. | 248/279.1 |
| 2006/0197003 | A1 * | 9/2006 | Oddsen, Jr. | 248/279.1 |
| 2007/0029457 | A1 * | 2/2007 | Baek | 248/372.1 |
| 2007/0195495 | A1 * | 8/2007 | Kim et al. | 361/681 |
| 2009/0166501 | A1 * | 7/2009 | Wang et al. | 248/419 |

* cited by examiner

TILTER FOR POSITIONING AN ELECTRONIC DEVICE

BACKGROUND OF THE INVENTION

The present invention relates to a tilter assembly for positioning an attached user device, for example an electronic device such as a flat-screen monitor.

Some existing tilter designs use a set screw and an elongated bushing positioned around the rotating shaft of a tilter to supply pressure to the rotating shaft in order to restrict rotation of the attached user device about the rotating shaft. In the prior art devices, the frictional force supplied by the elongated bushing to the rotating shaft provides all of the force for support of the attached user device in the desired position.

A limitation of the prior art is that fine adjustments of the force supplied by the bushing to the rotating shaft, and therefore precise counterbalancing of the weight of the user device, prove to be difficult. Reliance on frictional force to support all of the weight of the attached user device causes the prior art devices to act in a jerky manner or create a creaking noise when the position of the tilter is adjusted.

Accordingly, there is a need for a tilter assembly that allows for finer adjustment of the counterbalance force applied to the attached user device, while allowing for smoother and quieter positioning of the tilter assembly. An example of a prior art tilter assembly is disclosed in U.S. Pat. No. 6,505,988.

BRIEF DESCRIPTION OF THE DRAWINGS

The present invention will hereinafter be described in conjunction with the appended drawing figures wherein like numerals denote like elements.

DETAILED DESCRIPTION OF THE PREFERRED EMBODIMENTS

Figure 1:
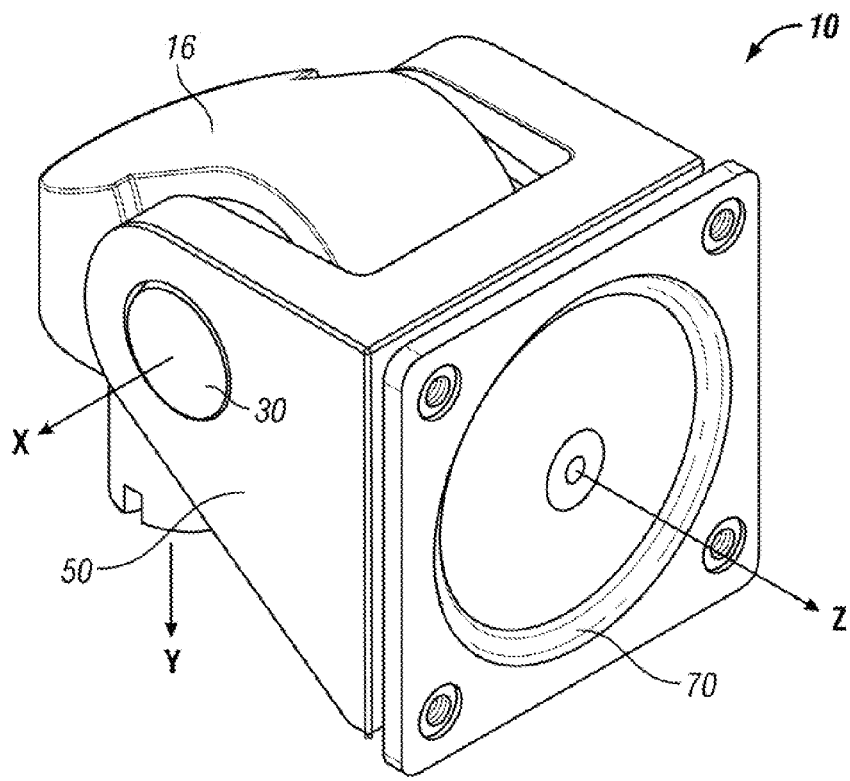
FIG. 1 is a front isometric view of a tilter in accordance with one embodiment of the present invention.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It being understood that various changes may be made in the function and arrangement of elements without departing from the spirit and scope of the invention, as set forth in the appended claims.

To aid in describing the invention, directional terms are used in the specification and claims to describe portions of the present invention (e.g., upper, lower, left, right, etc.). These directional definitions are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

Referring generally to FIGS. 1-15, two embodiments of a tilter 10, 110 for positioning an attached user device are shown. The tilters 10, 110 provide a user with the freedom to position the user device (not shown), which may be for example a flat-screen monitor, in a desired orientation in all three spatial dimensions. The tilter 10, 110 may be configured so that it is attachable to an articulating extension arm, stand, mount, or any number of other suitable mounting apparatuses (not shown).

Figure 2:
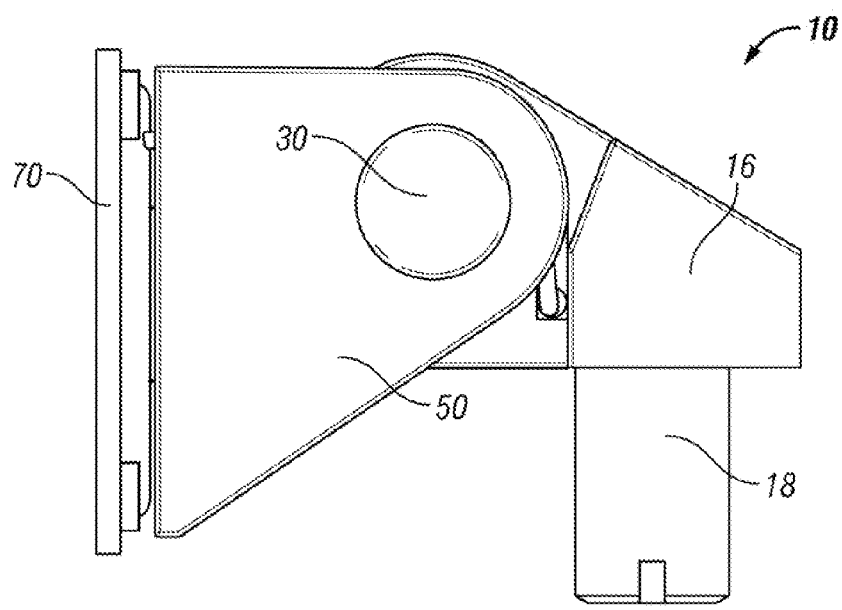
FIG. 2 is a side view of the tilter of FIG. 1.

Referring generally to FIGS. 1A-13, a first embodiment of the tilter 10 is shown. FIG. 1 is a perspective view of tilter 10, and FIG. 2 is a side view thereof. FIG. 1 shows how the tilter 10 can be rotated about all three axes, i.e. the X-axis "X", the Y-axis "Y", and the Z-axis "Z". The tilter 10 includes a tilter body 16 attached to a center tilt mount 50 by a friction cylinder 30. In this embodiment, the center tilt mount 50 has approximately a "U"-shape in cross section. The tilter 10 is rotated about the X-axis by rotating the center tilt mount 50 in relation to the tilter body 16 about the friction cylinder 30. A tilter body shaft 18 extends from the tilter body 16 and provides an attachment means for the mounting apparatus, if desired. The mounting apparatus could be, for example, a support surface, mounting cup or cylinder, or an articulating extension arm, stand, or forearm. The tilter 10 is rotated about the Y-axis by rotating the tilter body shaft 18 within its attachment means with the mounting apparatus. A rotating plate 70, which will be described in further detail below, is optionally attached to the center tilt mount 50. If the rotating plate 70 is included in the configuration of the tilter 10, the tilter 10 has freedom to rotate about the Z-axis by rotating the rotating plate 70 with respect to the center tilt mount 50 using a fastener 66 (see FIG. 3).

Figure 3:
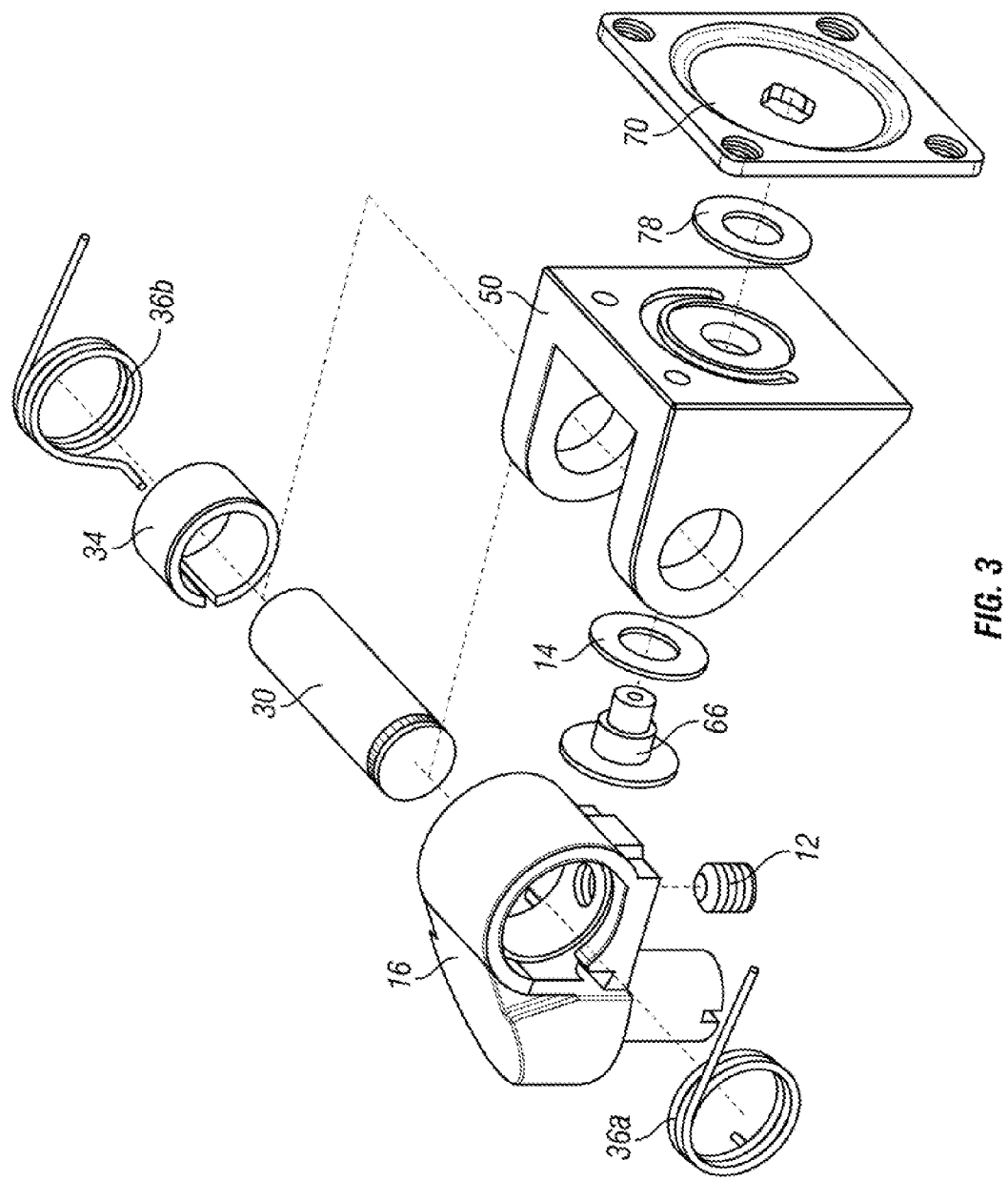
FIG. 3 is an exploded view thereof.

FIG. 3 illustrates an exploded view of the tilter 10. In this embodiment, the tilter body 16 includes a bushing hole 22 (see FIG. 4A) for accommodation of a bushing 34 and the friction cylinder 30. A set screw 12 is located within a threaded hole 29 (see FIG. 4C) in the tilter body 16. A pair of springs 36a, 36b are located on opposing sides of the tilter body 16 (see FIGS. 6A, 6B). In this embodiment, the springs 36a, 36b are torsional springs. It should be understood that other types of springs, for example extension or compression springs, are possible within the scope of this invention. As will be described in greater detail below, in this embodiment each spring 36a, 36b engages the tilter body 16 at a first end of the respective spring, and is further adapted to engage the center tilt mount 50 via the respective upper arm hole 62a, 62b (see FIGS. 7A-8) at the other end of the respective spring 36a, 36b.

If a rotating plate 70 is provided, it is attached to the center tilt mount 50 by a fastener 66, which in this embodiment is a rivet (see FIG. 1, in which the front portion of the rivet 66 has been compressed so as to attach the rotating plate 70 to the center tilt mount 50). Preferably, a first washer 14 is located between the rivet 66 and the center tilt mount 50, and a second washer 78 is located on the opposing side of the center tilt mount 50. If a rotating plate 70 is part of the configuration of the tilter 10, an adapter plate 90 (see FIG. 13) is attached to the rotating plate 70. As will be described in greater detail below, if the rotating plate 70 is omitted from the configuration of the tilter 10, the adapter plate 90 may be attached directly to the center tilt mount 50. The adapter plate 90 is adapted to attach, directly or indirectly, to the user device (not shown).

Figure 4A:
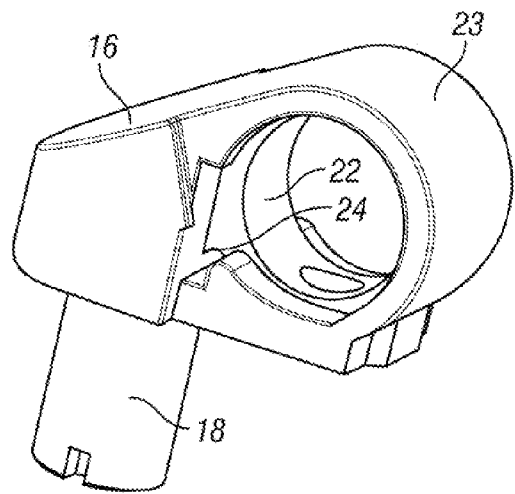
FIG. 4A is a side perspective view of a tilter body according to one embodiment of the present invention.
Figure 4B:
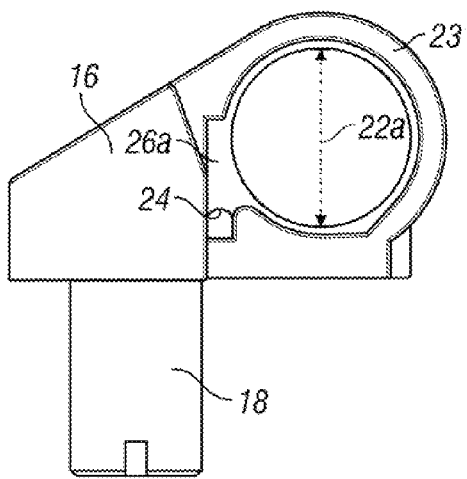
FIG. 4B is a side view thereof.
Figure 4C:
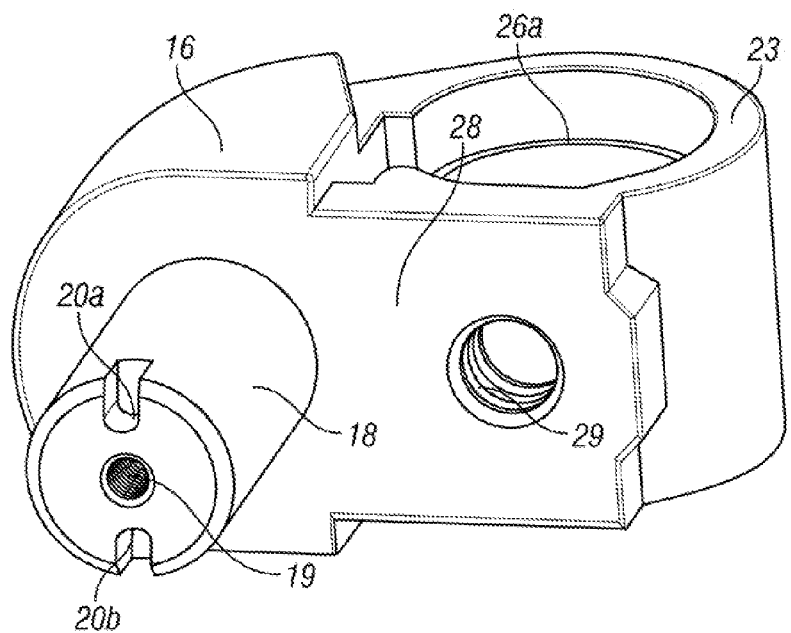
FIG. 4C is a bottom perspective view thereof.

Referring now to FIGS. 4A-4C, the tilter body 16 of the present embodiment will be described in greater detail. The tilter body 16 is preferably made from a metal, for example aluminum, though it should be understood that the tilter body 16 could be made from any number of suitable materials. The tilter body 16 has a sidewall 23 which partially surrounds a portion of the bushing hole 22. The bushing hole 22 has a diameter 22a. As best seen in FIG. 4B, the tilter body 16 further comprises a lower arm hole 24 which, in this embodiment, extends through the tilter body 16. It should be understood that, in the alternative, a pair of lower arm holes could be provided in the tilter body 16. As best seen in FIG. 4C, a threaded hole 29 for receipt of set screw 12 extends from the lower surface 28 of the tilter body 16 to the bushing hole 22. In this embodiment, the threaded hole 29 runs in a direction parallel to the Y-axis and orthogonal to the lower surface 28. In the alternative, the threaded hole 29 could be oriented at an angle that is not parallel to the Y-axis or orthogonal to the lower surface 28.

In this embodiment, the tilter body shaft 18 extends from the lower surface 28 in a direction parallel to the Y-axis and orthogonal to the lower surface 28. In the alternative, the tilter body shaft 18 could be oriented at an angle that is not parallel to the Y-axis or orthogonal to the lower surface 28. As best seen in FIG. 4C, in this embodiment the tilter body shaft 18 contains a central opening 19 and a pair of notches 20a, 20b. The central opening 19 and notches 20a, 20b comprise portions of a mechanism for preventing loosening of the tilter body shaft 18 when it is rotated about the Y-axis. This mechanism is fully disclosed in U.S. Pat. No. 7,540,457, which issued on Jun. 2, 2009, and is compatible with the present embodiment of the tilter 10. U.S. Pat. No. 7,540,457 is incorporated herein by reference as if fully set forth. In the alternative, the central opening 19 and notches 20a, 20b may be omitted from the tilter body shaft 18.

Figure 6A:
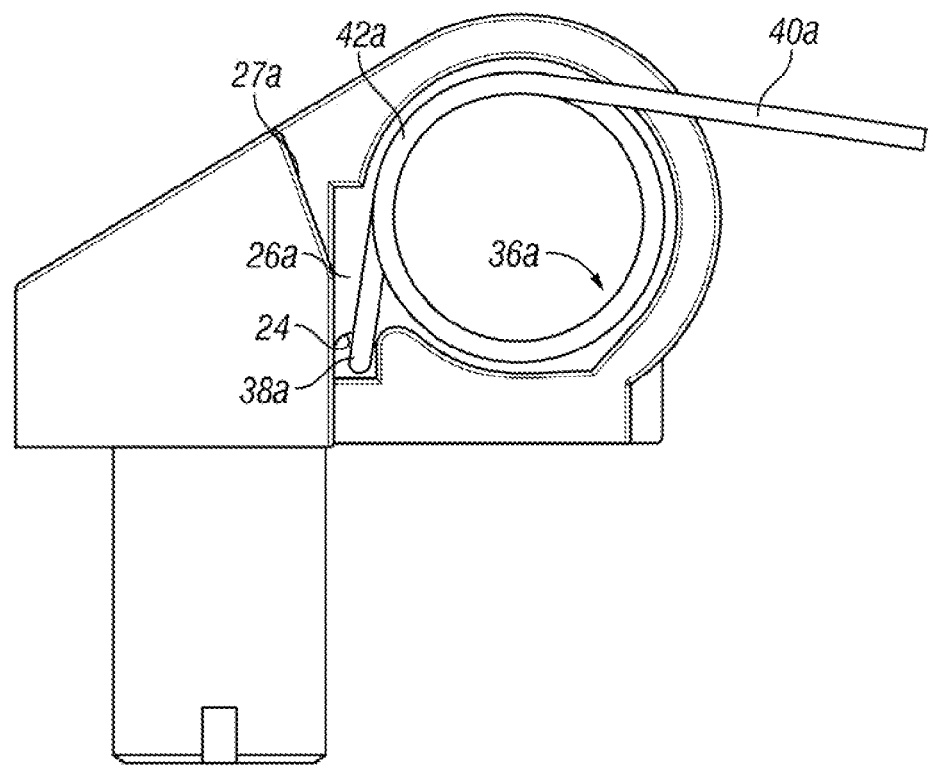
FIG. 6A is a side view of the spring shown in FIG. 5A positioned within the tilter body shown in FIG. 4A, with other components of the tilter removed.
Figure 6B:
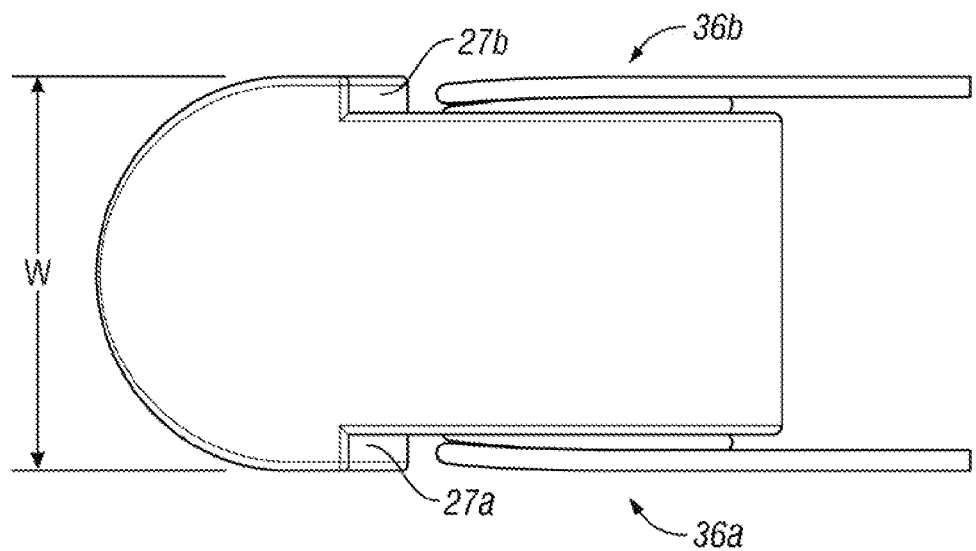
FIG. 6B is a top view thereof.

As best seen in FIGS. 4A-4C, the tilter body 16 further comprises a pair of indented surfaces 26a, 26b (26b not shown) which are located on opposite sides of the bushing hole 22 and are adapted to provide space for placement of the respective spring 36a, 36b, such that the springs 36a, 36b do not extend beyond the width W of the tilter body 16 when installed therein (see FIG. 6B). In this embodiment, the indented surfaces 26a, 26b extend all the way around the circumference of the bushing hole 22. The stepped surfaces 27a, 27b on the tilter body 16 provide adequate clearance for rotation of the center tilt mount 50 when it is rotated about the X-axis in an upward or positive direction (see FIGS. 1 and 2).

Figure 5A:
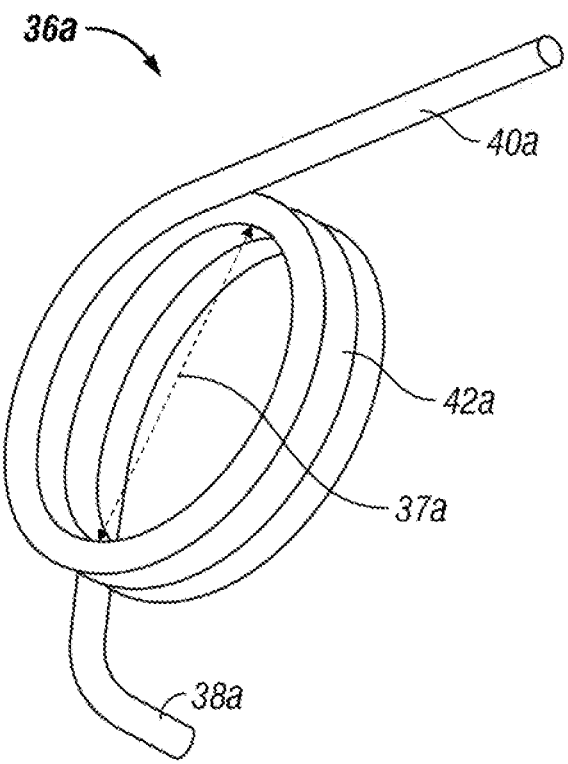
FIG. 5A is a perspective view of a spring according to one embodiment of the present invention.
Figure 5B:
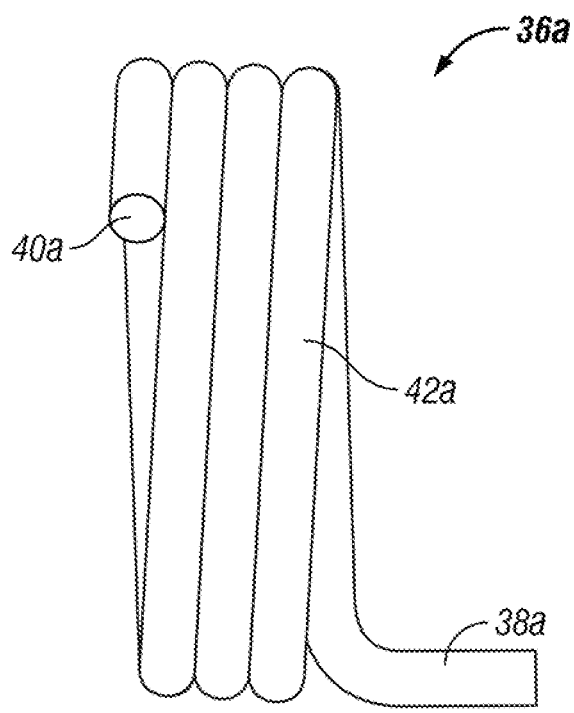
FIG. 5B is a front view thereof.

FIGS. 5A and 5B illustrate the spring 36a of the present embodiment. It should be understood that spring 36b is a mirror-image of spring 36a, yet otherwise identical thereto (see FIGS. 3, 6B, and 8). Spring 36a is comprised of a lower arm 38a, an upper arm 40a, and a coiled portion 42a which connects together the lower arm 38a and upper arm 40a. In this embodiment, the lower arm 38a comprises an approximately 90 degree bend, so that the lower arm 38a extends in a direction that is approximately orthogonal to the upper arm 40a, which in this embodiment is unbent. As best seen in FIG. 6A, the lower arm 38a extends into the lower arm hole 24, and the spring 36a rests adjacent the indented surface 26a. It should be understood that spring 36b engages the lower arm hole 24 and rests adjacent the indented surface (not shown) located on the other side of the tilter body 16 in an identical fashion. Therefore, as best seen in FIG. 6B, the springs 36a, 36b are partially nested within the tilter body 16. It should be understood that multiple orientations of the upper 40a, 40b and lower 38a, 38b arms are possible within the scope of this invention. It should be further understood that many types of springs may be used in place of the coil spring of the present embodiment within the scope of this invention.

When not subject to a compressive or extensive force, the coiled portion 42a of the spring 36a has an inner diameter 37a, which in this embodiment is approximately equal to the diameter 22a of the bushing hole 22 (see FIGS. 4B and 6A). The spring 36a also has an outer diameter (not labeled), which is larger than the diameter 22a of the bushing hole 22 for all of the tolerable deformation (i.e., compression or extension) states of the spring 36a. Further, the indented surfaces 26a, 26b (26b not shown) have a diameter (not labeled) that is at least as large as the outer diameter of the spring 36a for all of the tolerable deformation states of the spring 36a. A fortiori, the diameter 22a of the bushing hole 22 is smaller than the diameter of the indented portions 26a, 26b (26b not shown). These relative dimensions ensure that the spring 36a stays in position against the indented surface 26a through all of the tolerable deformation states of the spring 36a, and does not slip inside of the bushing hole 22. When the spring 36a is subject to an extensive force, i.e. when the center tilt mount 50 is rotated in an upward or positive direction about the X-axis, the inner diameter 37a of the spring 36a is increased. When the spring 36a is subject to a compressive force, i.e. when the center tilt mount 50 is rotated in a downward or negative direction about the X-axis, the inner diameter 37a of the spring 36a is decreased. The functioning of the springs 36a, 36b within the tilter 10 will be discussed in greater detail below.

Figure 7A:
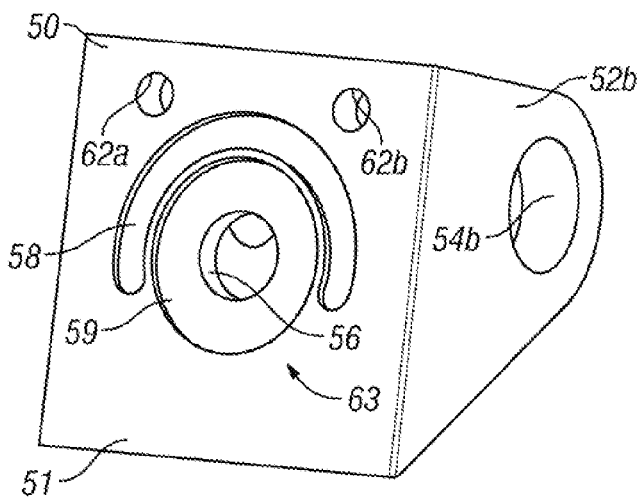
FIG. 7A is a front perspective view of a center tilt mount according to one embodiment of the present invention.
Figure 7B:
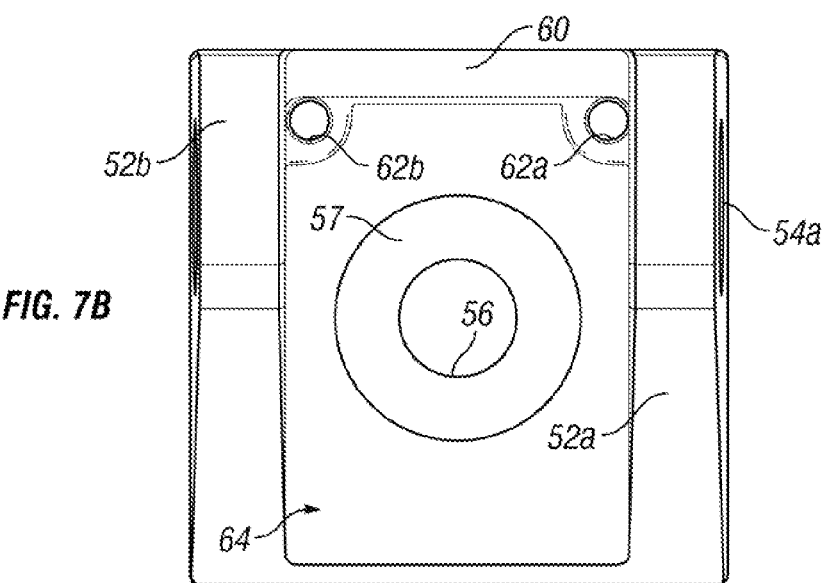
FIG. 7B is a rear view thereof.

FIGS. 7A and 7B show the center tilt mount 50 of the present embodiment in greater detail. The center tilt mount 50 is preferably made from a relatively lightweight, strong metal, such as aluminum, though it should be understood that any number of suitable materials could be used to make the center tilt mount 50. In this embodiment, the center tilt mount 50 is comprised of a base 51 and a pair of flanges 52a, 52b. Flange 52a includes friction cylinder hole 54a and flange 52b includes friction cylinder hole 54b. The friction cylinder holes 54a, 54b are aligned along the X-axis such that when the tilter body 16 is positioned between the flanges 52a, 52b and the friction cylinder holes 54a, 54b are aligned with the bushing hole 22, an extended tubular passageway is formed for receipt of the friction cylinder 30.

In this embodiment, a rivet hole 56 extends through the center of the base 51 of the center tilt mount 50. As best seen in FIG. 7B, a recessed portion 57 is located on the rear side 64 of the center tilt mount 50. The recessed portion 57 is adapted to securely receive the washer 14 and/or the head 67 (see FIG. 11) of the rivet 66. In this embodiment, the center tilt mount 50 is further comprised of upper arm holes 62a, 62b, each of which is adapted to receive the respective upper arm 40a, 40b (see FIG. 8) of the respective spring 36a, 36b. As best seen in FIG. 7B, in this embodiment an elongated stop 60 is provided on the rear side 64 of the center tilt mount 50. The stop 60 serves to arrest the rotation of the center tilt mount 50 about the X-axis in the upward or positive direction, thereby preventing an irreversible degree of deformation of the springs 36a, 36b. In alternate embodiments, the stop 60 may be omitted from the center tilt mount 50, or may be comprised of any number and/or arrangement of elements which serve to arrest the rotation of the center tilt mount 50 in the upward or positive direction about the X-axis. For example, the stop 60 may be replaced with a pair of stops, for example the generally cubic stops disclosed in U.S. Pat. No. 6,505,988, which issued on Jan. 14, 2003. U.S. Pat. No. 6,505,988 is incorporated herein by reference as if fully set forth.

The operation of the springs 36a, 36b within the tilter 10 will now be explained in detail. For simplicity, the operation of spring 36a will be described, though it should be understood that spring 36b operates in an identical fashion. As noted, spring 36a is comprised of lower arm 38a (which is positioned within the lower arm hole 24), coiled portion 42a, and upper arm 40a (which is positioned within the upper arm hole 62a in the center tilt mount 50). When the tilter 10 is assembled, as in FIG. 1, but no user device is attached to the rotating plate 70 or adapter plate 90, the spring 36a is under a slight degree of compression due to the weight of the center tilt mount 50 and the tilter components attached thereto, and the upper arm 40a is at least partially extended through the depth of the upper arm hole 62a such that it cannot come loose therefrom. When the user device is attached to the rotating plate 70 or adapter plate 90, the additional force that is placed on the upper arm 40a is transferred to the coiled portion 42a of the spring 36a, thereby compressing the coiled portion 42a so that the inner diameter 37a of the spring 36a is further decreased from the diameter of the spring 36a when it is in its uncompressed (equilibrium) state (which is shown in FIG. 5A). Because the lower arm 38a is contained within the lower arm hole 24 and therefore largely unable to move, compression of the coiled portion 42a results in the upper arm 40a being further extended through the upper arm hole 62a in a direction approximately towards the rotating plate 70 and/or adapter plate 90.

The spring 36a, when typically deformed, will be naturally biased to return to its equilibrium position. As a result of this tendency, the spring 36a will supply an amount of restorative force to the center tilt mount 50 that is directly correlated to the amount of force acting on the spring 36a. As discussed below with respect to the spring 36a, the restorative force will result whether the center tilt mount is rotated in an upward or a downward direction. The restorative force that is consequently applied by the spring 36a to the center tilt mount 50, the components of the tilter 10 which are attached to the center tilt mount 50, and the user device supplants the bushing 34 as providing the primary counterbalance force to support the weight of the user device in the desired position about the X-axis. In this embodiment, adjustment of the set screw 12 vis-à-vis the bushing 34 provides a secondary means of supporting the weight of any attached user device by permitting incremental quantities of force to be applied to the friction cylinder 30, thereby preventing rotation thereof. Because the springs 36a, 36b provide the primary counterbalance force for the tilter 10, the set screw 12/bushing 34 can be used to make finer, secondary adjustments to the overall amount of counterbalance force that is applied to the tilter 10, thereby increasing the adjustment precision thereof.

In addition, by reducing the amount of counterbalance force that need be supplied by the bushing 34 to the friction cylinder 30, the tendency of the friction cylinder 30 to stick or to create a creaking or chirping noise when it is rotated about the X-axis is reduced. Use of the springs 36a, 36b to supply the primary means of counterbalance force to support the center tilt mount 50 and any attached components, including the user device, permits the tension that need be supplied by the set screw 12 to the bushing 34 to be reduced accordingly. As a result, the center tilt mount 50 and friction cylinder 30, which as detailed below tend to rotate as a single unit, rotate in a smoother, more natural fashion while reducing the sticking effect and noises associated with greater friction fits between the bushing 34 and the friction cylinder 30.

Turning back to FIG. 7A, in this embodiment, the front side 63 of the center tilt mount 50 comprises a recessed portion 59 which is adapted to securely receive the washer 78 (see FIG. 3). The washers 78, 14 serve to protect the front 63 and rear 64 sides, respectively, of the center tilt mount 50 from damage when the rotating plate 70 is being rotated. The washers 78, 14 may be comprised of a plastic material, for example nylon.

In this embodiment, the front side 63 of the center tilt mount 50 also comprises a groove 58, which is approximately semi-circular in shape. It should be understood that the groove 58 is optional. In situations where it is desirable to limit the rotational range of the rotating plate 70 about the Z-axis, a protrusion (not shown) could be included on the rear side 72 of the rotating plate 70 (i.e. the side of the rotating plate 70 which faces the groove 58). The protrusion is fit snugly within the groove 58. The protrusion is permitted to move only along the groove 58 between the respective ends thereof, thereby limiting the rotational range of the rotating plate 70 about the Z-axis accordingly. In other words, the rotational range of the rotating plate 70 corresponds approximately with the arc length of the groove 58. Preferably, as in the present embodiment, the rotational range of the protrusion within the groove 58 corresponds with an arc of approximately 180 degrees, such that an attached user device may be oriented in any position up to and including those positions which are 90 degrees either clockwise or counter-clockwise from a vertical position (the vertical position being where the protrusion is located in the center of the length of the groove 58 of the present embodiment). In alternate embodiments, the ends of the groove could be located such that any possible desired rotational range is established, including where the groove forms a full circle which allows for 360 degree rotation of the rotating plate 70. U.S. patent application Ser. No. 11/058,820, filed Feb. 16, 2005, which is incorporated herein by reference as if fully set forth, discloses a similar protrusion and washer channel system for limiting the rotational movement of a rotating plate. It should be understood that where it is not desirable to limit the rotational range of the rotating plate 70 about the Z-axis, the protrusion, groove 58, and washer 78 may be omitted.

Figure 8:
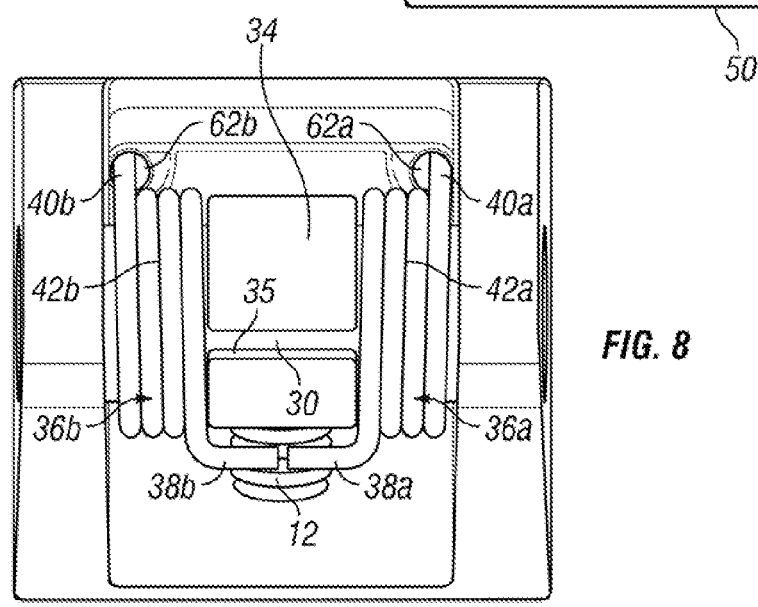
FIG. 8 is an elevated rear view of the tilter shown in FIG. 1, with the tilter body removed.

FIG. 8 illustrates an elevated rear view of the tilter 10 with the tilter body 16 removed from view. The bushing 34 is seen located around the friction cylinder 30, with the set screw 12 positioned against the outer surface of the bushing 34. The springs 36a, 36b are also clearly visible. The upper arms 40a, 40b are seen extending through the respective upper arm holes 62a, 62b, and the lower arms 38a, 38b are seen extending towards each other in the area where they are respectively located within the lower arm hole 24 of the tilter body 16.

Preferably, as in the present embodiment, the lower arms 38*a*, 38*b* do not come in contact with each other within the lower arm hole 24.

Figure 9:
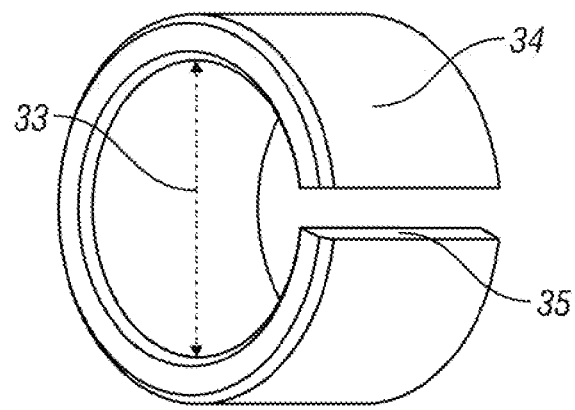
FIG. 9 is a perspective view of a split bushing according to one embodiment of the present invention.

The bushing 34 and friction cylinder 30 of the present embodiment will now be described in greater detail. FIG. 9 illustrates a perspective view of the bushing 34. In this embodiment, the bushing 34 is a split bushing having a gap 35. The bushing may be comprised of any number of suitable materials, for example a metal such as oil-infused bronze or copper, or a deformable plastic. When not subject to a compressive or extensive force, the bushing 34 has an inner diameter 33, which in this embodiment is slightly larger than the diameter 31 (see FIG. 10) of the friction cylinder 30. The bushing 34 also has an outer diameter (not labeled) which is smaller than the diameter 22*a* of the bushing hole 22. When the set screw 12 is rotated within the threaded hole 29 of the tilter body 16 such that a portion of the set screw 12 extends into the bushing hole 22, the set screw 12 contacts the outer surface of the bushing 34. Because the bushing 34 is snugly located within the bushing hole 22, the force applied by the set screw 12 to the bushing 34 causes the gap 35 to reduce in size, thereby decreasing the inner diameter 33 of the bushing 34 and causing the bushing 34 to apply force to the outer surface of the friction cylinder 30. As the set screw 12 is extended further into the bushing hole 22, the force transferred to the friction cylinder 30 by the bushing 34 increases, thereby limiting the rotational ability of the friction cylinder 30. As detailed above, the set screw 12 and bushing 34 may be used in this embodiment to make precise, secondary adjustments to the amount of counterbalance force applied to the tilter 10.

Figure 10:
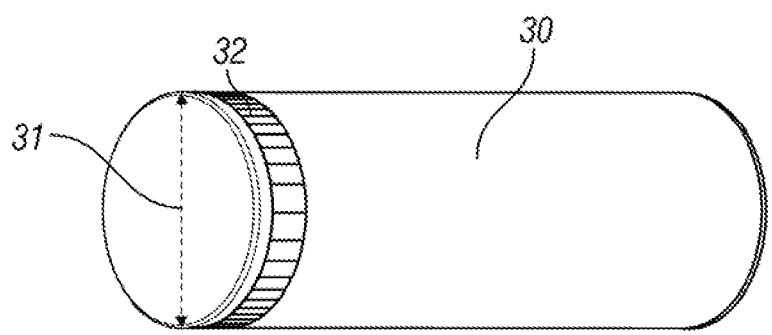
FIG. 10 is a perspective view of the friction cylinder shown in FIG. 3.

FIG. 10 illustrates the friction cylinder 30 according to the present embodiment. The friction cylinder 30 is generally cylindrical in shape, and is preferably fabricated from a metal such as steel, though it should be understood that other suitable materials are possible within the scope of this invention. As best seen in FIG. 10, the friction cylinder 30, at one end thereof, has a knurl band 32 disposed about its outer circumference. The diameter 31 of the friction cylinder 30 and the diameter (not labeled) of the friction cylinder holes 54*a*, 54*b* are nearly equal. Thus, when the friction cylinder 30 is inserted through the tilter body 16 and center tilt mount 50, the knurl band 32 makes a secure friction fit against the circumference of one of the friction cylinder holes 54*a*, 54*b*, thereby preventing the friction cylinder 30 from coming loose from the center tilt mount 50 during normal operation of the tilter 10. Due to the snug fit created by the interaction of the knurl band 32 with the circumference of one of the friction cylinder holes 54*a*, 54*b*, the friction cylinder 30 and center tilt mount 50 will in effect move together as a single unit as the position of the center tilt mount 50 is adjusted about the X-axis. Preferably, the width of the knurl band 32 is equal to the width of the flanges 52*a*, 52*b* such that the knurl band 32 contacts the respective friction cylinder hole (54*a* or 54*b*) over a maximum possible area. It should be understood that widths of the knurl band 32 that are greater or lesser than the width of the flanges 52*a*, 52*b* are possible within the scope of this invention.

Figure 11:
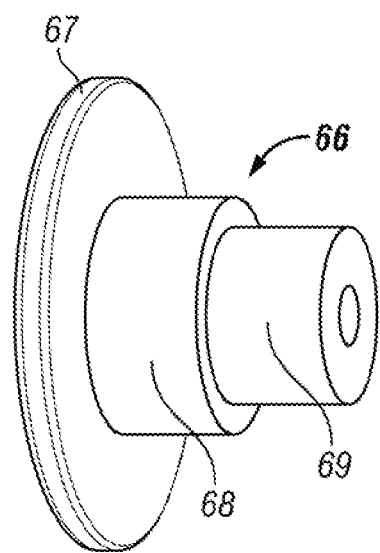
FIG. 11 is a perspective view of the rivet shown in FIG. 3.

The rivet 66 is illustrated in greater detail in FIG. 11. The rivet 66 is preferably made from a material that is plastically deformable and sufficiently malleable such that it will not fracture during deformation, for example a metal such as steel. In this embodiment, the rivet has a head 67 that fits at least partially within the recessed portion 57 located on the rear side 64 of the center tilt mount 50. The rivet 66 has a first cylindrical portion 68 and a second cylindrical portion 69. The first cylindrical portion 68 has a diameter that is slightly smaller than the diameters of the rivet holes 56, 73 located, respectively, on the center tilt mount 50 and the rotating plate 70. The length of the first cylindrical portion 68 is such that it may pass through the rivet holes 56, 73. The second cylindrical portion 69 has a diameter that is smaller than the diameter of the first cylindrical portion 68. The second cylindrical portion 69 is of sufficient length to protrude above the surface of the recessed portion 74 located on the rotating plate 70 with enough excess such that it can be deformed in order to securely fasten the rotating plate 70 to the center tilt mount 50. A compatible rivet is disclosed in U.S. Pat. No. 6,505,988.

Figure 12A:
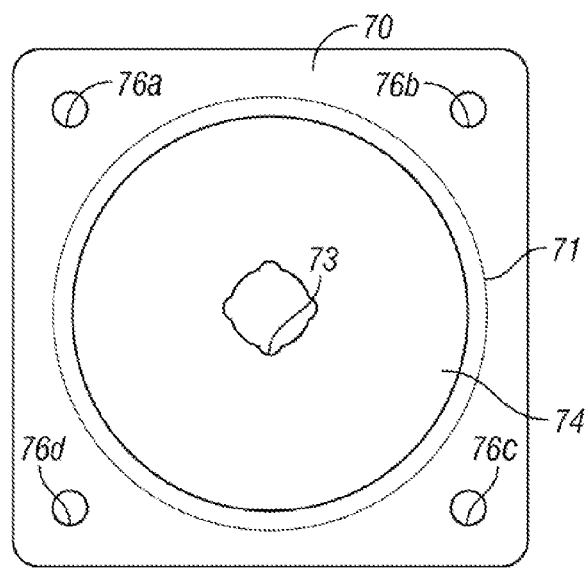
FIG. 12A is a front view of the rotating plate shown in FIG. 3.
Figure 12B:
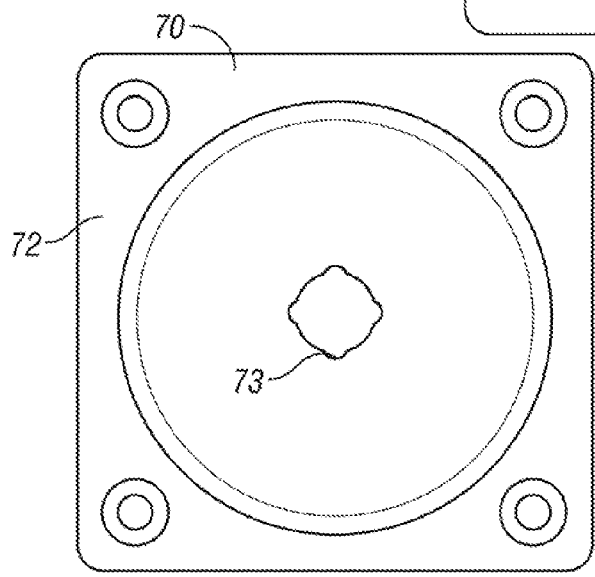
FIG. 12B is a rear view thereof.

Referring now to FIGS. 12A and 12B, the rotating plate 70 of the present embodiment is shown in greater detail. The rotating plate 70 is rotatably secured to the center tilt mount 50 by the rivet 66 (see FIG. 1). The axis of rotation of the rotating plate 70, i.e. the Z-axis, is preferably orthogonal to the axis of rotation of the center tilt mount 50 about the friction cylinder 30, i.e. the X-axis. The rotating plate 70, as shown in FIGS. 12A and 12B, has front 71 and rear 72 sides that are approximately square, and has a rivet hole 73 therethrough at its center. The rivet hole 73 may be circular, or may have some other suitable shape. Preferably, as in the present embodiment, the rivet hole 73 has a "flower" or dimpled shape that helps to hold the rivet 66 in place. The rotating plate has a recessed portion 74 on the front side 71 thereof, which provides clearance for the second cylindrical portion 69 of the rivet 66 once it has been deformed so that the second cylindrical portion 69 does not interfere with the adapter plate 90. Four mounting holes 76*a*-76*d* are used to attach the rotating plate 70 to the adapter plate 90. A compatible rotating plate is disclosed in U.S. Pat. No. 6,505,988.

As mentioned above, it should be understood that the rotating plate 70 is optional. In certain applications, it may not be desirable to allow for movement of the attached user device about the Z-axis, for example where the user device is a keyboard or laptop computer. In these applications, the rotating plate 70 could be excluded from the construction of the tilter 10. If the rotating plate 70 is omitted, the adapter plate 90 would be mounted directly to the center tilt mount 50.

Figure 13:
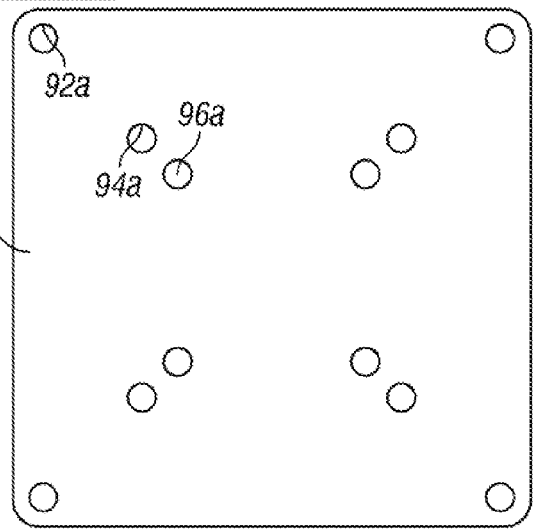
FIG. 13 is a front view of an adapter plate according to one embodiment of the present invention.

FIG. 13 illustrates one embodiment of the adapter plate 90. The adapter plate 90 is preferably made from a strong material such as metal, and is preferably steel, though other suitable materials for the adapter plate 90 are possible within the scope of this invention. The adapter plate has holes 92*a*-92*d* (92*b*-92 not labeled) which are aligned with the mounting holes 76*a*-76*d* in the rotating plate 70. The adapter plate 90 is attached to the rotating plate 70 by inserting pins, screws, nuts and bolts, or other suitable fasteners through the holes 92*a*-92*d* and the respectively aligned mounting holes 76*a*-76*d*. In this embodiment, the adapter plate 90 has two sets of holes 94*a*-94*d* (94*b*-94*d* not labeled) and 96*a*-96*d* (96*b*-96*d* not labeled). Each of the two sets of holes 94*a*-94*d*, 96*a*-96*d* correspond to existing VESA mount standards. The holes 94*a*-94*d* correspond with the so-called large standard or "MIS-D 100" standard, with the holes 94*a*-94*d* forming the corners of a square having side lengths equal to 100 mm. The holes 96*a*-96*d* correspond with the so-called small standard or "MIS-D 75" standard, with the holes 96*a*-96*d* forming the corners of a square having side lengths equal to 75 mm. Thus, the adapter plate 90 of the present embodiment can be attached to a user-device having mounting holes which correspond with either the VESA mount small standard or VESA mount large standard. In alternate embodiments, the adapter plate could be equipped with only one of the two sets of holes 94*a*-94*d*, 96*a*-96*d*, or could include other mounting holes corresponding with other industry standards, such as one or more of the "MIS-E" or "MIS-F" VESA standards, or a universal mounting pattern.

Where the rotating plate 70 is omitted from the construction of the tilter 10 such that the adapter plate 90 is connected directly to the center tilt mount 50, the adapter plate may be fitted with a rivet hole in the center thereof. In this arrangement, a recessed portion is preferably provided in the adapter plate in the area of the rivet hole, so that the rivet 66, once deformed, does not impact the rear of the user device that is attached to the adapter plate. In the alternative, the center tilt mount 50 could be fitted with mounting holes which align with the mounting holes of the adapter plate. The adapter plate is attached to the center tilt mount 50 by inserting pins, screws, nuts and bolts, or other suitable fasteners through the aligned holes. A compatible adapter plate is disclosed in U.S. Pat. No. 6,505,988.

Figure 14:
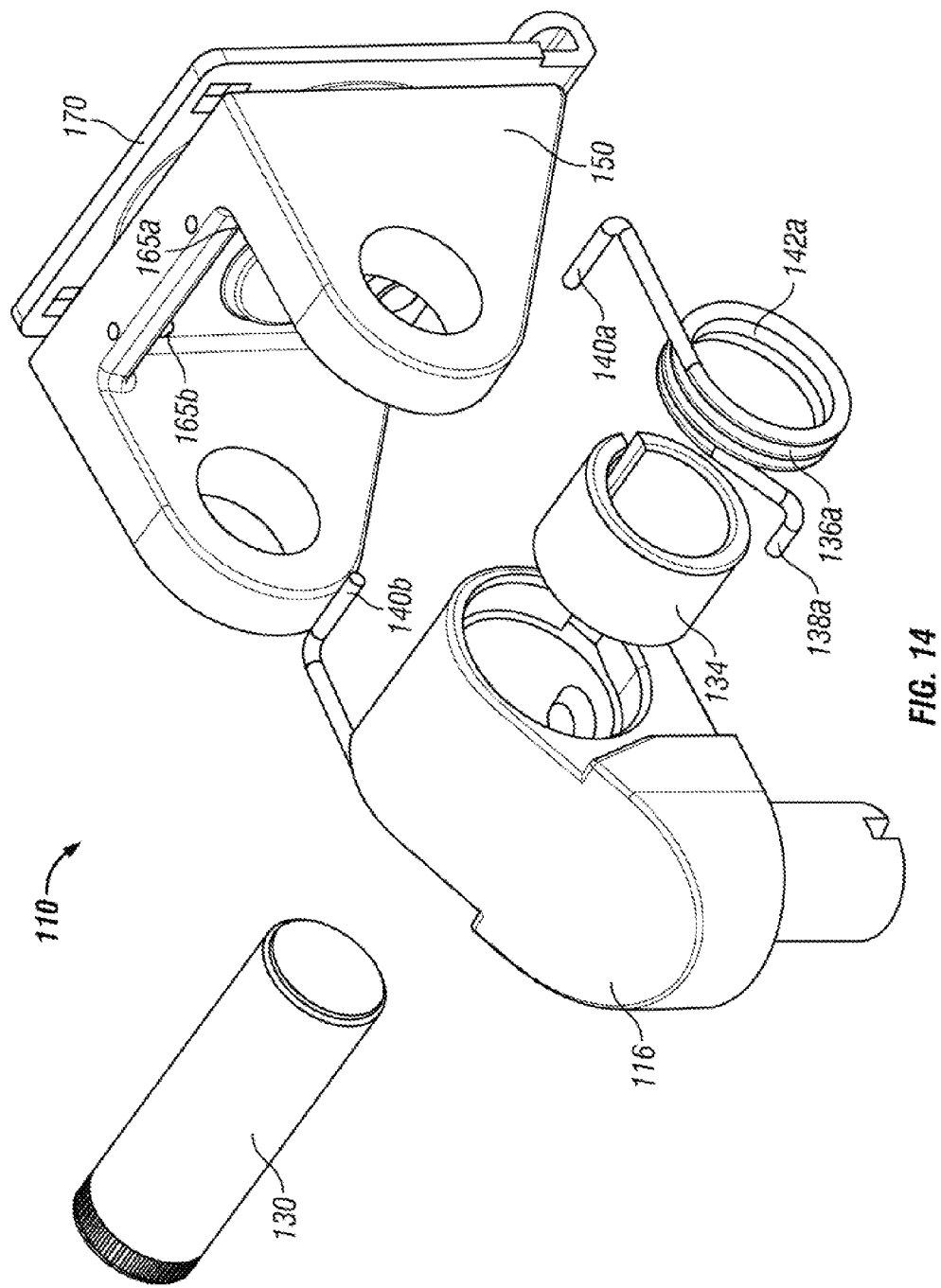
FIG. 14 is a partial exploded view of a tilter in accordance with a second embodiment of the present invention.

FIG. 14 illustrates a second embodiment of a tilter 110 according to the present invention. In this embodiment, elements shared with the first embodiment (tilter 10) are represented by reference numerals increased by factors of 100. For example, the tilter body 16 in FIGS. 1-4C, 6A, and 6B corresponds to the tilter body 116 in FIG. 14. In the interest of clarity, some features of this embodiment that are shared with the first embodiment are numbered in FIG. 14, but are not repeated in the specification.

In this embodiment, the center tilt mount 150 includes a pair of posts 165*a*, 165*b* which extend downwardly from the top edge of the center tilt mount 150 in a direction that is approximately parallel with the Y-axis. The springs 136*a*, 136*b* have respective upper arms 140*a*, 140*b* which have an approximately 90 degree bend therein. By way of example, to attach spring 136*a* to the tilter 110, the upper arm 140*a* is secured around the post 165*a*, i.e. the upper arm 140*a* is placed between the post 165*a* and the rear side 164 of the center tilt mount 150. Spring 136*b* is secured around post 165*b* in an identical fashion. Lower arms 138*a*, 138*b* (138*b* not shown) are then inserted within the lower arm hole 124 (not shown) in an identical fashion to how the lower arms 38*a*, 38*b* are attached to the lower arm hole 24 of the tilter 10. It should be understood that multiple orientations of the upper and lower arms are possible within the scope of this invention.

Figure 15:
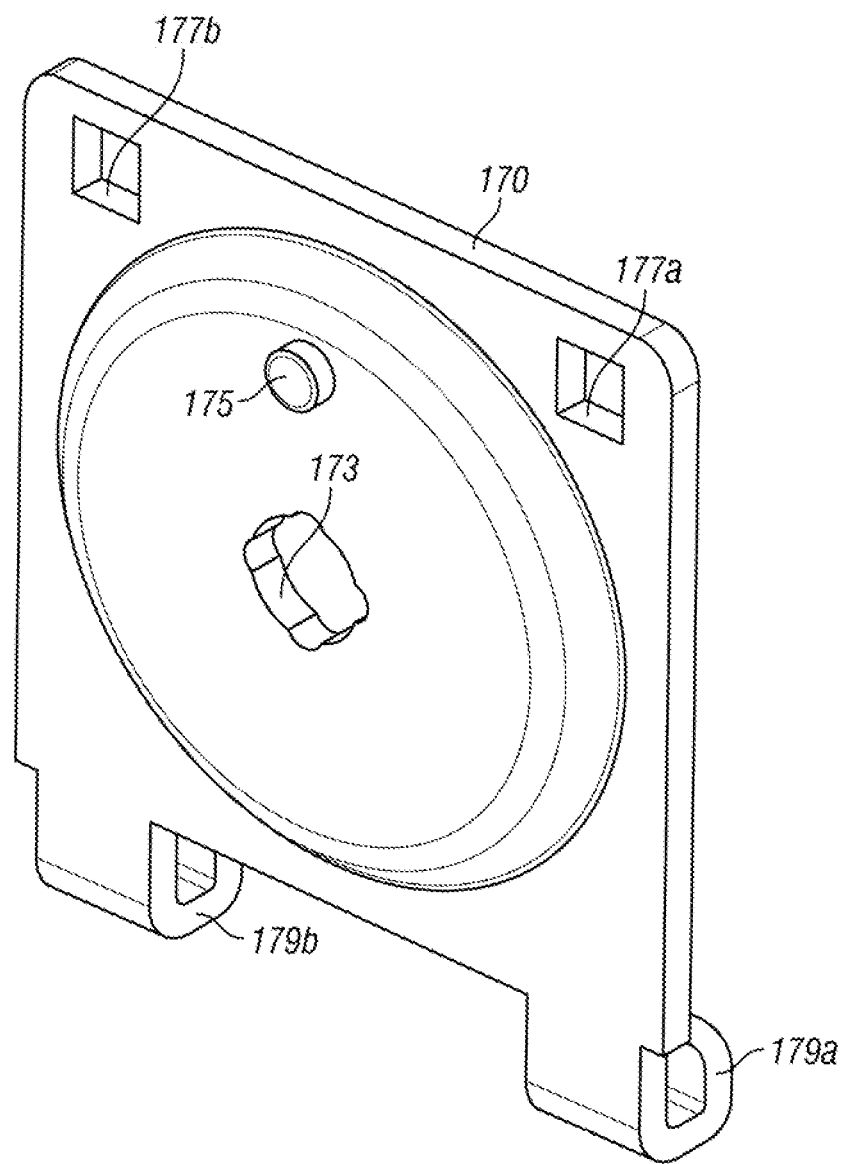
FIG. 15 is a perspective view of the rotating plate shown in FIG. 14.

FIG. 15 shows the rotating plate 170 of the second embodiment. In this embodiment, the rotating plate 170 has a protrusion 175 on the rear side thereof. The protrusion 175 is adapted to engage a groove on the front side of the center tilt mount 150 (see similar groove 58 in FIG. 7A) which, as detailed above, work in conjunction to limit the rotational freedom of the rotating plate 170 about the Z-axis. In this embodiment, the rotating plate 170 has openings 177*a*, 177*b* and hooks or angled members 179*a*, 179*b* which are adapted to receive and/or support components of the quick release assembly disclosed in U.S. patent application Ser. No. 11/058,820, filed on Feb. 16, 2005, the contents of which are enclosed herein by reference as if fully set forth. It should be understood that the rotating plate 170 and quick release assembly of U.S. patent application Ser. No. 11/058,820 could also be used in conjunction with the tilter 10 according to the first embodiment, or with alternate embodiments of the tilter.

While the principles of the invention have been described above in connection with preferred embodiments, it is to be clearly understood that this description is made only by way of example and not as a limitation of the scope of the invention.

The invention claimed is:

1. A tilter for supporting an electronic device, the tilter comprising:
    a tilter body that is attachable to a mounting apparatus and has a hole located therethrough;
    a center tilt mount, the center tilt mount being attachable to the electronic device and rotatably attached to the tilter body about an axis of rotation;
    a friction cylinder that is fixedly attached to the center tilt mount and passes through the hole in the tilter body along the axis of rotation, the friction cylinder being rotatable relative to the tilter body about the axis of rotation; and
    at least one torsional spring having a coiled portion, a first end, and a second end, the coiled portion having an inner diameter, the at least one torsional spring being coupled at the first end to the tilter body and coupled at the second end to the center tilt mount;
    wherein the friction cylinder extends through the inner diameter of the coiled portion; and
    wherein the at least one torsional spring has a lower arm at the first end thereof and an upper arm at the second end thereof, wherein one of the lower arm and the upper arm engages an arm hole located in the tilter body, the arm hole having a complete perimeter defining an opening of a cavity in the tilter body in which the one of the lower arm and the upper arm is at least partially located,
    further comprising a bushing located within the hole in the tilter body, wherein an interior surface of the bushing is in contact with an outer surface of the friction cylinder, wherein an inner diameter of the bushing is adjustable in order to supply a variable quantity of frictional force to the friction cylinder via adjustment of the position of a set screw against an exterior surface of the bushing.

2. The tilter of claim 1, wherein the at least one torsional spring is at least partially nested within the tilter body.

3. The tilter of claim 1, wherein a width of the at least one torsional spring does not extend beyond a width of the tilter body.

4. The tilter of claim 1, wherein the lower arm and the upper arm are approximately orthogonal to each other.

5. The tilter of claim 1, wherein the lower arm and the upper arm are approximately parallel to each other.

6. The tilter of claim 1, wherein the other of the lower arm and the upper arm engages an arm hole located in the center tilt mount, wherein the at least one torsional spring has an equilibrium position, wherein a position of the other of the lower arm and the upper arm moves within the arm hole located within the center tilt mount as the at least one torsional spring is displaced from the equilibrium position.

7. The tilter of claim 1, wherein the arm hole located in the tilter body is located exterior to the hole through which the friction cylinder passes.

8. A tilter for supporting an electronic device, the tilter comprising:
    a tilter body that is attachable to a mounting apparatus and has a hole located therethrough, the tilter body further including a first exterior surface, a second exterior surface that opposes the first exterior surface, and an arm hole extending therethrough between the first exterior surface and the second exterior surface;
    a center tilt mount, the center tilt mount being attachable to the electronic device and rotatably attached to the tilter body about an axis of rotation;
    a friction cylinder that is fixedly attached to the center tilt mount and passes through the hole in the tilter body along the axis of rotation, the friction cylinder being rotatable relative to the tilter body about the axis of rotation; and
    at least one torsional spring having a coiled portion, the coiled portion having an inner diameter, the at least one torsional spring being coupled at a first end to the tilter body and coupled at a second end to the center tilt mount;
wherein the friction cylinder extends through the inner diameter of the coiled portion; and
wherein the at least one torsional spring has a lower arm located at the first end thereof and an upper arm located at the second end thereof, the lower arm having an end portion and the upper arm having an end portion, wherein a respective end portion of at least one of the lower arm and the upper arm is oriented parallel to the axis of rotation,
wherein one of the lower arm and the upper arm engages the arm hole located in the tilter body, and
wherein the arm hole located in the tilter body is oriented parallel to the axis of rotation,
further comprising a bushing located within the hole in the tilter body, wherein an interior surface of the bushing is in contact with an outer surface of the friction cylinder, wherein an inner diameter of the bushing is adjustable in order to supply a variable quantity of frictional force to the friction cylinder via adjustment of the position of a set screw against an exterior surface of the bushing.

9. The tilter of claim 8, wherein the end portions of both of the upper arm and the lower arm are oriented parallel to the axis of rotation.

10. The tilter of claim 8, wherein a width of the at least one torsional spring does not extend beyond a width of the tilter body.

11. The tilter of claim 8, wherein the lower arm and the upper arm are approximately orthogonal to each other.

12. The tilter of claim 8, wherein the lower arm and the upper arm are approximately parallel to each other.

13. The tilter of claim 8, wherein the first end of the at least one torsional spring is directly coupled to the arm hole located in the tilter body and the second end of the at least one torsional spring passes through a hole located in the center tilt mount.

14. The tilter of claim 8, wherein the at least one torsional spring is directly coupled at the first end to the arm hole located in the tilter body, and the arm hole is located exterior to the hole in the tilter body through which the friction cylinder passes.

* * * * *